(12) United States Patent
Geddes, Jr. et al.

(10) Patent No.: US 7,343,323 B1
(45) Date of Patent: Mar. 11, 2008

(54) BUSINESS TRANSACTION SYSTEM AND METHOD

(75) Inventors: William T. Geddes, Jr., Woodbridge, VA (US); Peter N. Chase, Manassas, VA (US); Thomas G. Gherardi, Manassas, VA (US)

(73) Assignee: GCG, LLC, Manassas, VA (US)

( * ) Notice: Subject to any disclaimer, the term of this patent is extended or adjusted under 35 U.S.C. 154(b) by 370 days.

(21) Appl. No.: 09/650,045

(22) Filed: Aug. 29, 2000

(51) Int. Cl.
*G06Q 30/00* (2006.01)

(52) U.S. Cl. .............................. 705/26; 705/1; 705/17; 705/27

(58) Field of Classification Search .................... 705/1, 705/14, 26, 27, 37, 39, 28, 29, 17; 706/37, 706/39
See application file for complete search history.

(56) References Cited

U.S. PATENT DOCUMENTS

| | | | | |
|---|---|---|---|---|
| 5,466,919 A | * | 11/1995 | Hovakimian | 705/17 |
| 5,621,640 A | * | 4/1997 | Burke | 705/14 |
| 5,754,938 A | | 5/1998 | Herz et al. | |
| 5,761,662 A | | 6/1998 | Dasan | |
| 5,784,608 A | | 7/1998 | Meske, Jr. et al. | |
| 5,806,045 A | * | 9/1998 | Biorge et al. | 705/14 |
| 5,819,092 A | * | 10/1998 | Ferguson et al. | 717/113 |
| 5,864,828 A | * | 1/1999 | Atkins | 705/36 |
| 5,884,280 A | * | 3/1999 | Yoshioka et al. | 705/26 |
| 5,930,474 A | | 7/1999 | Dunworth et al. | |
| 6,052,674 A | * | 4/2000 | Zervides et al. | 705/40 |
| 6,073,170 A | | 6/2000 | Sumita et al. | |
| 6,105,001 A | * | 8/2000 | Masi et al. | 705/14 |
| 6,105,865 A | | 8/2000 | Hardesty | |
| 6,112,191 A | * | 8/2000 | Burke | 705/41 |
| 6,134,533 A | * | 10/2000 | Shell | 705/26 |
| 6,272,507 B1 | | 8/2001 | Pirolli et al. | |
| 6,460,036 B1 | | 10/2002 | Herz | |
| 6,477,509 B1 | * | 11/2002 | Hammons et al. | 705/27 |
| 6,519,629 B2 | | 2/2003 | Harvey et al. | |

(Continued)

FOREIGN PATENT DOCUMENTS

CA 2254378 * 10/1999

OTHER PUBLICATIONS

The website www.igive.com (way back Machine) (Mar. 2000).*

(Continued)

*Primary Examiner*—F. Ryan Zeender
*Assistant Examiner*—M. Thein
(74) *Attorney, Agent, or Firm*—Loza & Loza, LLP; Heidi Eisenhut

(57) ABSTRACT

A system and method for enabling a user, over a computer and communications network, to allocate a portion of proceeds of a transaction to a beneficiary by selecting a provider acceptable to a user, determining an arrangement on the fly based on user defined prioritized parameters, and allocating a determined portion of the proceeds to an information server, the provider, and the beneficiary, using a payment entity. The user may quickly and efficiently expand a search for providers of a specified good, service, and/or information, while maintaining a desired link to the beneficiary, such as a particular geographic community, a community of interest, or a user-preferred class of providers. Thus, a user may conduct an on-the-fly targeted search for a specified search object from providers associated with a similarly specified beneficiary group resulting in an allocation of proceeds to the beneficiary.

12 Claims, 14 Drawing Sheets

U.S. PATENT DOCUMENTS

| | | | |
|---|---|---|---|
| 6,581,041 B1 * | 6/2003 | Canney | 705/35 |
| 6,592,030 B1 | 7/2003 | Hardesty | |
| 6,609,113 B1 * | 8/2003 | O'Leary et al. | 705/39 |
| 6,629,136 B1 | 9/2003 | Naidoo | |
| 6,631,358 B1 | 10/2003 | Ogilvie | |
| 6,662,164 B1 * | 12/2003 | Koppelman et al. | 705/14 |
| 2001/0032181 A1 | 10/2001 | Jakstadt et al. | |
| 2002/0008146 A1 * | 1/2002 | Singhal | 235/472.01 |
| 2002/0059226 A1 | 5/2002 | Cooper | |
| 2002/0077904 A1 | 6/2002 | Ali | |
| 2002/0082920 A1 | 6/2002 | Austin et al. | |
| 2002/0107731 A1 | 8/2002 | Teng | |
| 2002/0116287 A1 | 8/2002 | Schubert et al. | |
| 2002/0123898 A1 | 9/2002 | Lemay et al. | |
| 2002/0123926 A1 | 9/2002 | Bushold et al. | |
| 2002/0123936 A1 | 9/2002 | Hansen et al. | |
| 2002/0138445 A1 | 9/2002 | Laage et al. | |
| 2003/0061114 A1 | 3/2003 | Schwartz et al. | |
| 2004/0083183 A1 | 4/2004 | Hardesty et al. | |

OTHER PUBLICATIONS

The website Whatis.com definition of "on the fly".*
www.babymint.com website, Oct. 2, 2002, pp. 1-5.
XP-002241679 "Database Selection and Search Strategy Optimization—The COSI Search Protocol." 1st AHC 16th Annual Meeting—Advances in Information Session. (pp. 1-8) (Jun. 19, 2000).
XP-000895328 "Architecture of a Metasearch Engine that Supports User Information Needs." Glover et al. (pp. 210-216) (Feb. 11, 1999).
"New Spin On Affiliate Retailing", Ted Kemp, *News & Analysis,* Nov. 2001.
"The Way to Save For College", www.upromise.com, Nov. 2001.
"The Sharper Image", www.sharperimage.com, Nov. 2001.
"The Sharper Image—Affiliate Program", www.shaperimage.com, Nov. 2001.
Francis M. Sherwin et al., Provisional Application as-filed on Jul. 28, 2000 for "Affinity Shopping Portal", pp. 1-13, and Figs. 1-4 (PRA 2 0006 P).

* cited by examiner

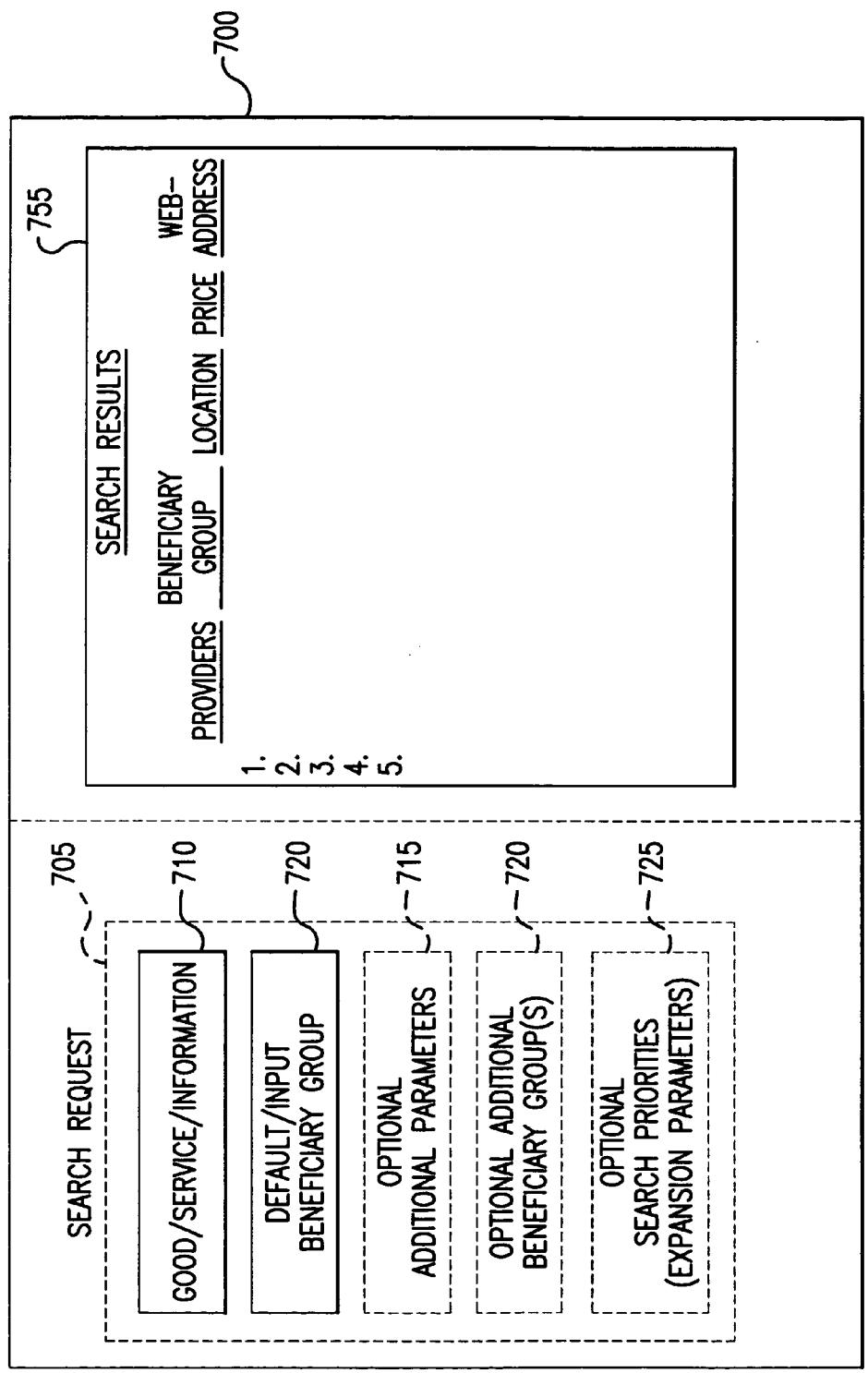

BUSINESS TRANSACTION SYSTEM AND METHOD

FIELD OF THE INVENTION

The present invention relates to systems and methods for transacting business in general, and more particularly to systems and methods for associating users and providers over the Internet.

BACKGROUND OF THE INVENTION

In order to sell goods and services at relatively low prices, sales volume needs to increase. As such, sellers who can establish a name and a large volume of sales across the state, country, or even across the world, can afford to sell their goods and services at relatively low prices compared to smaller local sellers.

A seller's willingness to sell large volumes of goods at relatively low prices, and a buyer's desire to purchase goods at the lowest price, tends to drive buyers to purchase from large regional, national or even multi-national retail outlets. Thus, the buyer is driven away from the small local "mom and pop" stores of the local communities. If a buyer chooses to avoid purchasing goods or services from the small "mom and pop" stores of the local community, these stores cease to exist. With the loss of these stores, a piece of the community also ceases to exist. Accordingly, there exists a strong need to find a way to balance a buyer's desire to purchase goods and services at relatively low prices, with the need to maintain links to the local community.

Other than buying goods or services from the local community, a buyer of today can choose to purchase goods or services, or find information, on the Internet. However, to do so, a buyer must conduct a search of a great deal of information existing on the internet, and thereafter must progressively attempt to narrow the search until the desired good, service or information is found. Thus, there exists a need to find a quick and efficient way to locate providers of goods, services or information specifically desired by the buyer. Further, there also exists a need to find a way to tie the internet to the local community of the buyer.

SUMMARY OF THE INVENTION

The present invention is directed to a system and method that offers a user (such as a buyer or consumer) a fast and efficient way to progressively expand a search for providers of specified "search objects" including goods, services, or information; while maintaining a desired link to a specified "beneficiary group" including a particular geographic community, community of interest, or user-preferred class of provider. More specifically, the system and method permits the association of the user and/or provider of a specified search object with at least one of a plurality of such beneficiary groups. The system and method affords the user an arrangement for searching for a provider associated with a user-specified beneficiary group or groups. Thus, a user may conduct a targeted search for a specified search object from providers associated with a similarly specified beneficiary group. The search object or beneficiary group can thereafter be expanded by the user, until the user selects a provider of the user-specified goods, services or information, associated with the user-specified beneficiary group(s).

BRIEF DESCRIPTION OF THE DRAWINGS

The present invention will become more fully understood from the detailed description given herein below and the accompanying drawings which are given by way of illustration only, and thus are not limitative of the present invention, wherein like reference numerals represent like elements and wherein:

FIG. 7 is an exemplary screen display of a computer device;

DETAILED DESCRIPTION OF PREFERRED EMBODIMENTS

Figure 1:
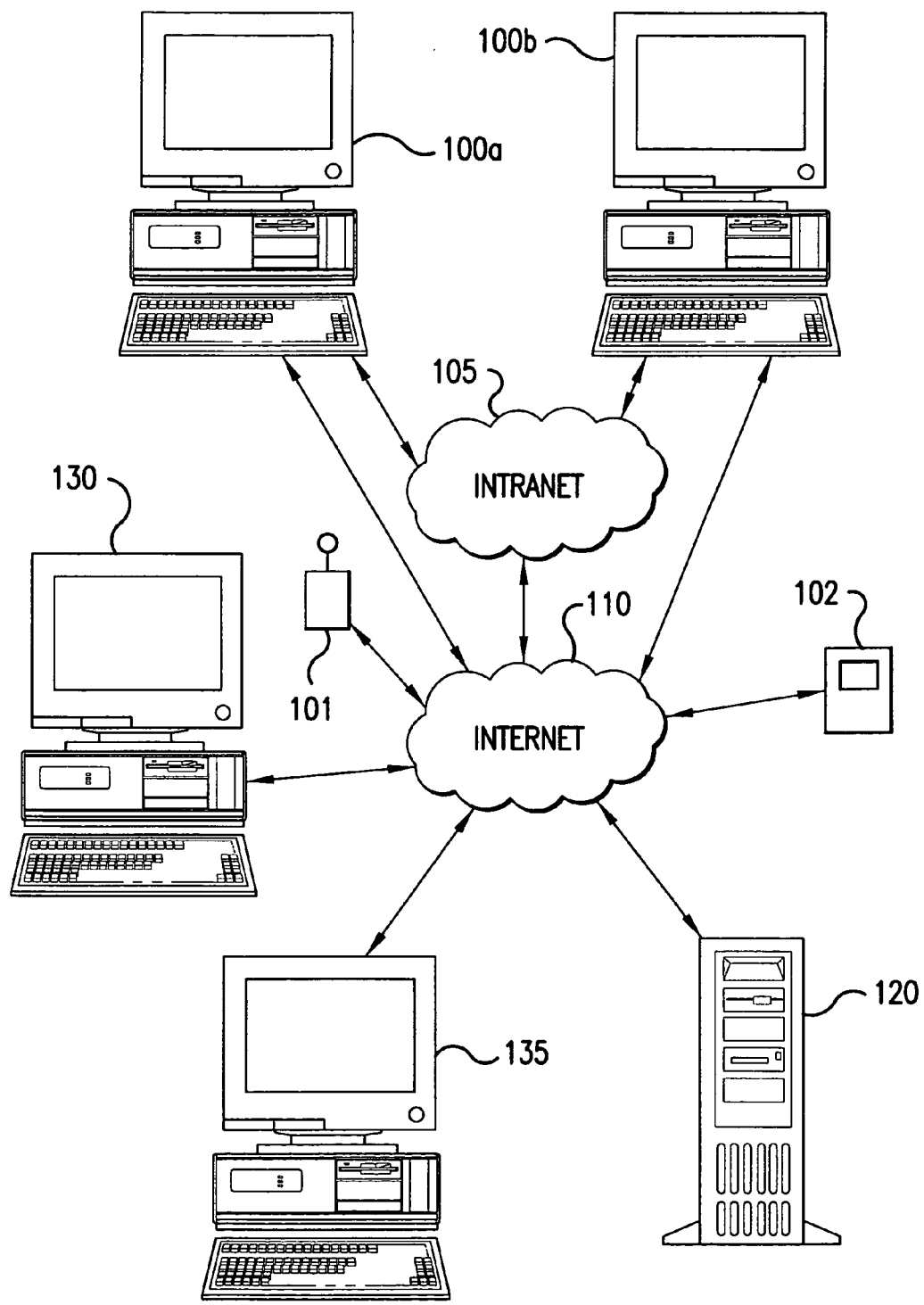
FIG. 1 illustrates an environment of the system and method of the present invention.

The various aspects of the present invention provide a user (including buyers and consumers) with an arrangement for searching on a computer device in an efficient manner, to obtain a provider of information, goods or services desired by the user; and also provide the user with the ability to maintain desired associations to specified beneficiary groups (such as those of a specified local community, for example). The user first associates with (by pre-registration or later specification) at least one of a plurality of beneficiary groups; and the associated beneficiary group is utilized in combination with a user-specified search request, to search for a user-specified search object (including information, goods or services) from a provider associated with a beneficiary group of the user. Thus, the method and system of the invention permits a user-specified search of a limited universe of providers associated with a beneficiary group common to the user.

The search arrangement preferably includes a synergistic dynamically modifiable concentric circle arrangement. The concentric circles are preferably expandable such that a user can first specify a beneficiary group(s) (by default after pre-registration or by a specified input), such as the local Korean Methodist Church for example; and after having received a null or otherwise unsatisfactory search result, can then expand the search by expanding the specified beneficiary group(s), to include all Korean churches for example. The synergistic concentric circle arrangement is preferably not only used to expand the beneficiary group, but can also be used to expand the search in other ways, such as geographically for example. A search can originally be limited to preferred providers who are members of the Korean Methodist Church of Fairfax, Va., and can later be expanded to include all members of the all the Korean Churches in the state of Virginia.

By means of such a search, the user is able to identify a provider of a desired good, service or piece of information who is associated with the user-specified beneficiary group. Thus, the user maintains beneficial commercial ties to the community, and/or to one or more beneficiary groups.

Throughout this application, use of the term "user" designates any user specifying any type of desired good, service or information, including but not limited to a buyer and a consumer; use of the term "provider" encompasses any entity such as sellers or distributors, offering any good, service or information, for any reason including but not limited to purchase, distribution, rent or otherwise; and "computer device" encompasses any type device with a central processor including, but not limited to, a personal computer, PDA, wireless mobile phone, etc. Further, a "beneficiary group" includes any group or organization that a user or provider desires to help or associate with, including, but not limited to, a particular geographic community (e.g. "Fairfax Va."), a community of interest (e.g. the Boy Scouts of America) and a user-preferred class of providers (e.g. a college or university, a charitable organization, a church, etc.). Finally, "search object" includes, but is not limited to, any user-specified good, service or information desired by the user.

FIG. 1 is an example of an overall environment for the system and method of the present invention, involving a type of network connection between a computer device of a user and an information server 120. The computer device includes any device with a central processor, including but not limited to a personal computer 100a or 100b, a wireless mobile phone 101, a personal digital assistant (PDA) 102, or any other device connectable to a network, such as the Internet for example. More specifically, the information server 120 typically includes a database for storing information and a controller for receiving a request from the computer device. The information server 120 typically connects to the computer device through some type of network such as the Internet 110. In the present application, the server 120 preferably includes a database for storing information regarding at least one of users and/or providers; and beneficiary groups. Even more preferably, the database includes information associating at least one of a user with at least one beneficiary group, and a provider with at least one beneficiary group. Thus, providers also preferably have access to information server 120, and input desired information to information server 120 through a computer device such as computer 135 for example (or any other "computer device") and a network, such as the Internet 110. This information can not only include information associating the provider with at least one beneficiary group, but can also include information on the goods, services or information offered by the provider.

Accordingly, as depicted in FIG. 1, both users and providers are preferably connected to the information server 120. The provider can be connected to the information server 120 through any type of computer device, such as personal computer 135, and is even more preferably connected to the server 120 through the Internet 110. The user can also be connected to the server 110 through any type of computer device, including but not limited to personal computer 100a, 100b or 130, wireless mobile unit 101, or personal digital assistant 102. Connections can be made through the internet 110 for example, or can also be made through an intranet 105 which links computer terminals 100a or 100b, and which eventually connects to the server 120 through internet 110; or can be made through any type of wireless or wired connection. Again, the illustration of FIG. 1 is merely to be considered exemplary, and encompasses all network connections, both wireless and wired, between any type of computer device used by users and providers, and any type of central storage device such as information server 120.

Figure 2:
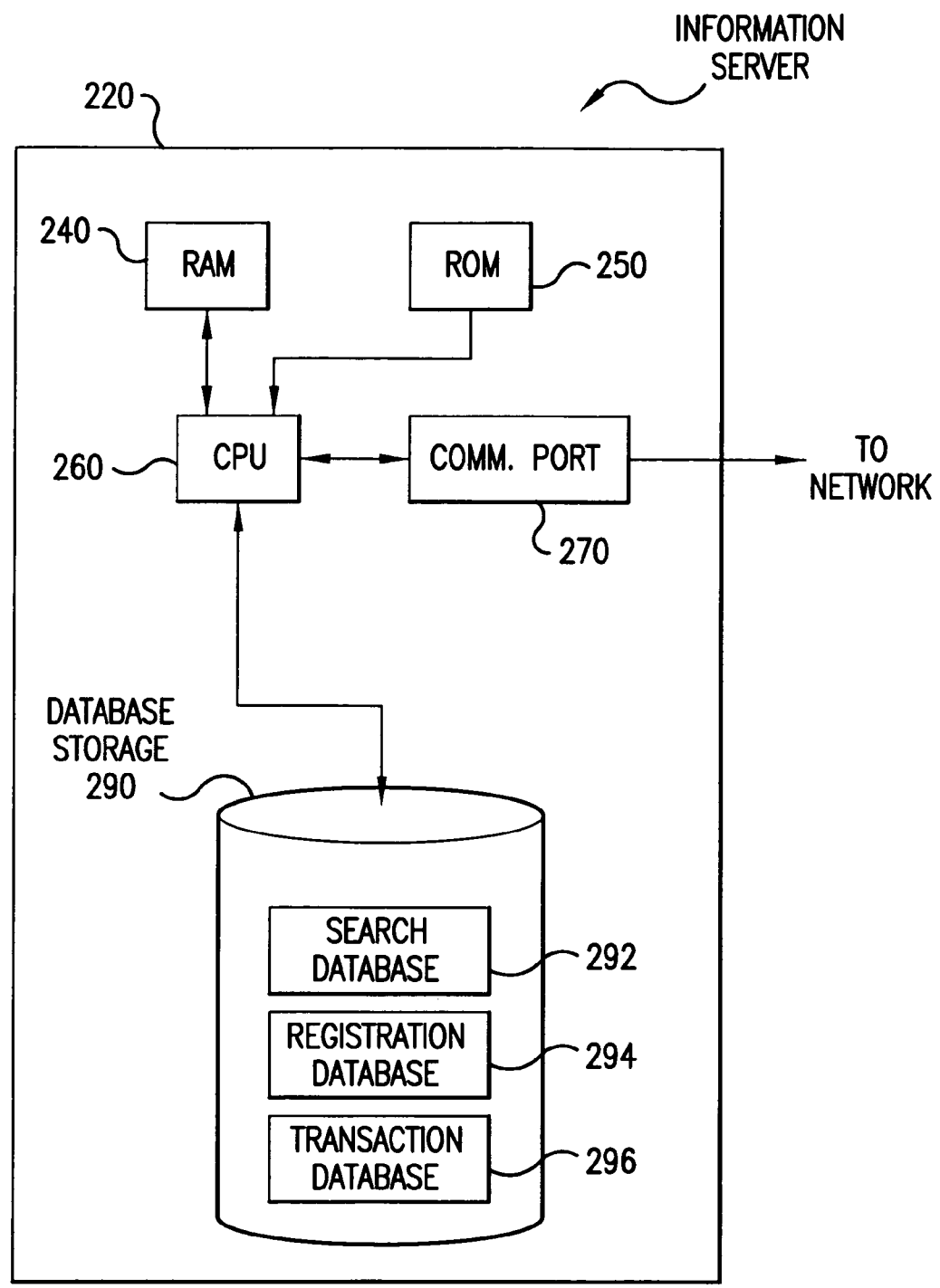
FIG. 2 illustrates an example of the central server system as shown in FIG. 1.

FIG. 2 is a more detailed illustration of the information server 120 of FIG. 1, and is designated by element 220 in FIG. 2. FIG. 2 is a block diagram of an exemplary information server 220 of the overall system of FIG. 1. The information server 220 preferably includes a CPU 260 acting as a controller and operatively connected to memory elements (RAM 240 and ROM 250). The CPU 260 is operatively connected to the network (such as internet 110) and eventually to the computer device (100a, 100b, 101, 102 or 130) of the consumer through communications port 270.

The CPU 260 is adapted to receive a request for a "search object", from a computer device of the user, for a provider of a good, service or information associated with a user-specified beneficiary group(s); and is adapted to search for providers of the user-specified good, service or information who are members of, or otherwise associated with, the user-specified beneficiary group(s). This is preferably done based in a dynamically expandable synergistic concentric circle arrangement based upon the search request and at least one beneficiary group associated with the user. If a matching provider is found, a result of the search is output to the computer device.

As shown in FIG. 2, the CPU 260 is further operatively connected to database storage device 290. The database storage device 290 may include a variety of databases including but not limited to a search database 292 for enabling searches of users for providers based on a search request, a registration database 294 (FIG. 3) and a transaction database 296 for tracking transactions between users, providers, and beneficiary groups. The aspect of users and providers registering and storing associations with at least one beneficiary group in registration database 294; and the aspects of associating users and providers with at least one beneficiary group as well as providing an arrangement to users for searching for providers associated with common beneficiary groups of users, preferably in a dynamically expandable synergistic concentric circle arrangement, will be explained hereafter.

Figure 3:
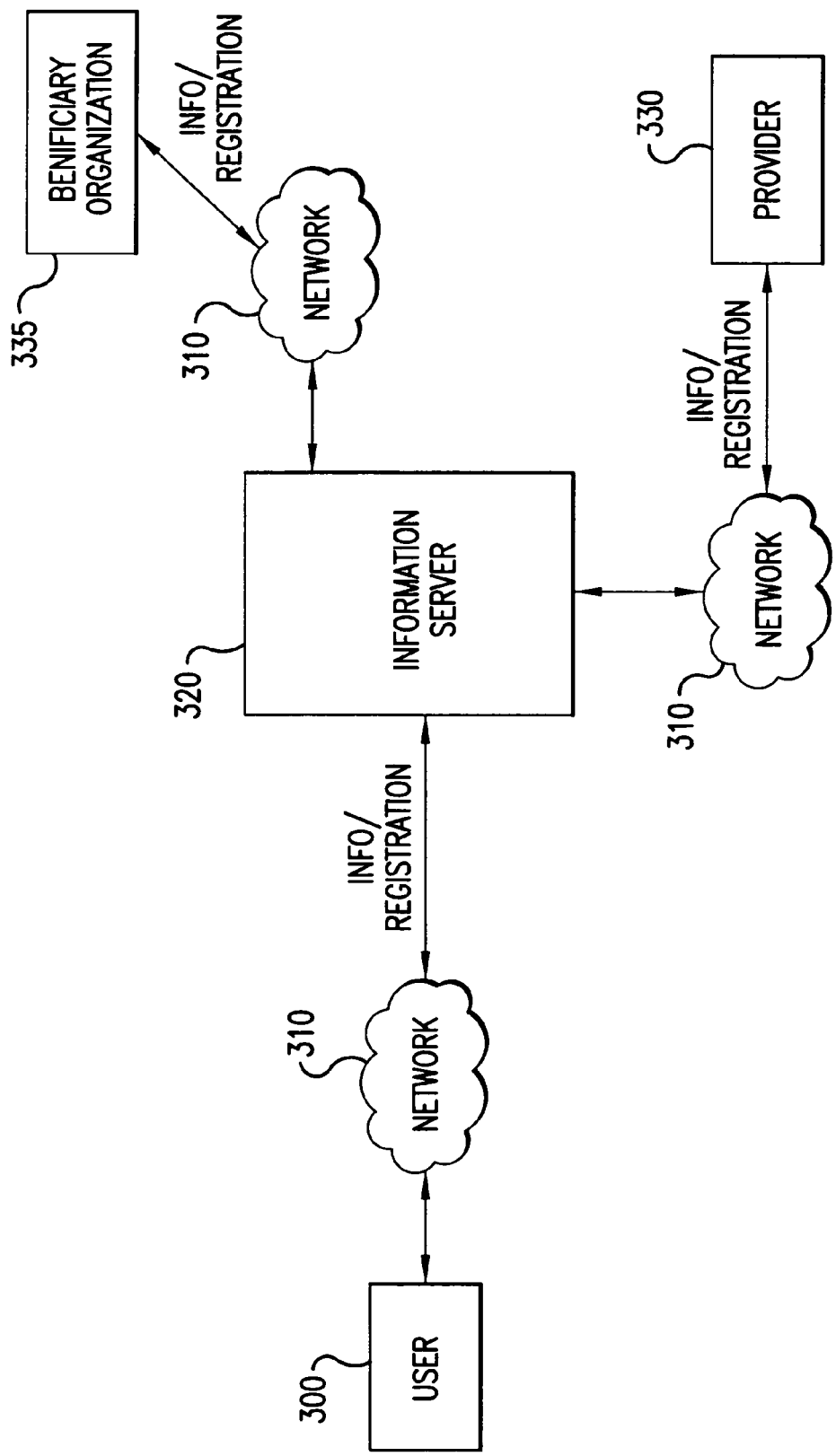
FIG. 3 shows an example of the aspect of providing information to and from the central system server.

FIG. 3 illustrates, in block diagram form, the overall arrangement of a preferred embodiment of the system of the present application. In the system, the information server 320 (depicted by element 220 in FIG. 2 and element 120 in FIG. 1) is connected to each of a user 300, provider 330, and a beneficiary group 335 via some type of network 310, such as the internet, for example. As such, a user 300 preferably registers with the information server 320, and thereby provides information associating the user with one or more of a plurality of beneficiary groups. Even more preferably, the user 300 (if he/she so desires) is associated with a plurality of beneficiary groups which can be hierarchically ranked by priority of the user 300. Similarly, the provider 330 also registers with the information server 320, and is also associated with at least one of a plurality of beneficiary groups. Even more preferably, the provider 330 is associated with a plurality of beneficiary groups. The provider 330 further registers any goods, services or information he desires to offer; his location; optional pricing information; a link to his website; and any other relevant information. Finally, in another preferred embodiment, the beneficiary group 335 may also register with the information server 320 to thereby associate itself with the system.

With regard to the beneficiary group 335, its registration not only acts to establish a link between a provider 330 and the user 300 for search purposes, but its registration also enables it to benefit from transactions (for goods, services or information) occurring therebetween as a result of the search. For example, in another preferred embodiment of the invention, not only does the system act as a search system, but it also acts to link a user 300 and provider 330 to conduct business transactions regarding the requested good, service or information. Accordingly, the owner of the information server 320 can set up the system so that the owner receives a small percentage of the proceeds of any transaction, occurring as a result of a search, between provider 330 and user 300, wherein a portion of the percentage of the proceeds or another small percentage of the transaction, is also sent to the registered beneficiary group 335 associated with the transaction. Thus, beneficiary group 335 will be encouraged to register with the information server 320 and the user 300 will know that he is not only purchasing from a provider 330 associated with a common beneficiary group, but that any transaction resulting from a search will result in a benefit to his/her specified beneficiary group.

It should be noted that while, for typical exemplary purposes, a user 300 may be designated as a consumer and a provider 330 may be designated as a distributor of goods, services or information, this need not always be the case. The present invention is not so limited. For example, two providers can also register and interact in a transaction, wherein one provider acts as user 300 and the other provider acts as provider 330 (the so-called business to business or b to b transaction, as opposed to the typical customer to business or c to b transaction). In addition, a consumer to consumer transaction can also occur, for any of goods, services, or information, wherein one consumer acts as user 300 and another consumer registers and acts as provider 330 to thereby establish a customer to customer transaction (c to c transaction).

Once the aforementioned information has been registered and stored in the registration database 294 of the information server 320, a search can be conducted by user 300. In fact, as long as providers 330 are registered so as to distribute goods, services or information, user 300 can input a beneficiary group to thereby associate him or herself for the beneficiary group, without the need to formally register in association with one or more beneficiary groups. Thus, a user 300 can either input and thereby specify a beneficiary group(s), or register in association with one or more beneficiary groups (or both), to be able to locate a provider of desired goods, services or information similarly associated with the beneficiary group. Accordingly, users 300 need not complete any formal registration process before beginning a search on the present system, and the system and method of the present invention is not so limited.

Further, a user 300 need not necessarily input a beneficiary group along with an input search request. Such a beneficiary group(s) may be associated with a serch object of a user by default. For example, if the user 300 is registered in association with a beneficiary group, or if the user 300 is registered with a plurality of prioritized or hierarchically ranked beneficiary groups, then a beneficiary group or groups may, by default, automatically be specified and associated with the input search request of a user 300. As such, a provider 330 associated with the registered beneficiary group of the user 300, will be located without input in association with the search request. Of course, it should be understood that such defaults may and will be overridden by a beneficiary group input by the user 300 along with a search object, as part of an input search request. Further, it should also be understood that a beneficiary group to be associated with a search of a user 300 may be varied by the user 300 "on-the-fly", in response to a null or otherwise unsatisfactory search result for example.

Figure 4:
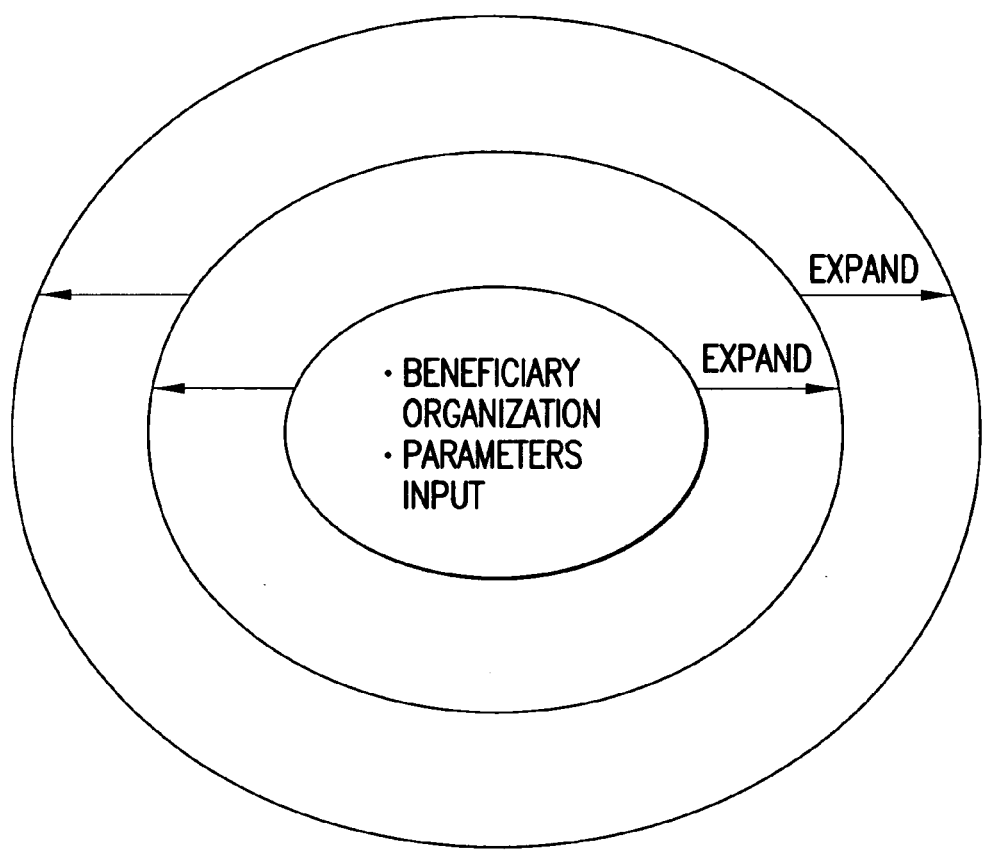
FIG. 4 is an illustration of expanding concentric circles.

FIG. 4 depicts one example of a synergistic concentric circle arrangement for searching for or locating a provider 330. In addition to a user 300 inputting a typical search request for a desired search object (good, service or information), a user 300 is also associated with a beneficiary group (either through input, registration, or both). The user 300 can either input and thereby specify and associate himself with beneficiary group (which can be changed on-the fly) at the same time as input of the other parameters of the search for the desired good, service or information; or a user 300 can default to a preregistered beneficiary group(s) (or pre-prioritized beneficiary groups) and thereby specify a beneficiary group(s). In either event, a limited search is first conducted for providers 330 of the requested search object who are members of or otherwise associated with the user-specified beneficiary group(s), based upon the input parameters of the search request and user-specified beneficiary group, to thereby form the first inner synergistic concentric circle of the search arrangement. The limited search is one of only limited providers 330 registered to provide the requested good, service or information and registered in association with the user-specified beneficiary group(s) of the user.

The search may thereafter be expanded, in response to a user 300 receiving a null or otherwise unsatisfactory search result for example, based on predetermined and assigned priorities or by expanding the search parameter(s) or beneficiary group(s) in response to a prompt. The prompt could be one indicating null or otherwise unsatisfactory search results based on the initial search, or one requesting further expansion. In either event, by expanding an input parameter or by expanding or making more general the designation, of the beneficiary group (either through re-input or in an originally input prioritized or hierarchical manner), a second synergistic concentric circle of the search arrangement is formed. Thus, a dynamic capability to expand the synergistic concentric circle arrangement is preferably provided. Still further, the search may be varied by further expanding (or even contracting to narrow an overly-broad second synergistic concentric circle) aspects of the search object, other aspects of the search request, or beneficiary group, thereby expanding the second synergistic concentric circle to form a third concentric circle and so on. This process can be repeated by the user 300 in a similar manner, until a satisfactory search result and desired provider 330 are located.

Figure 5:
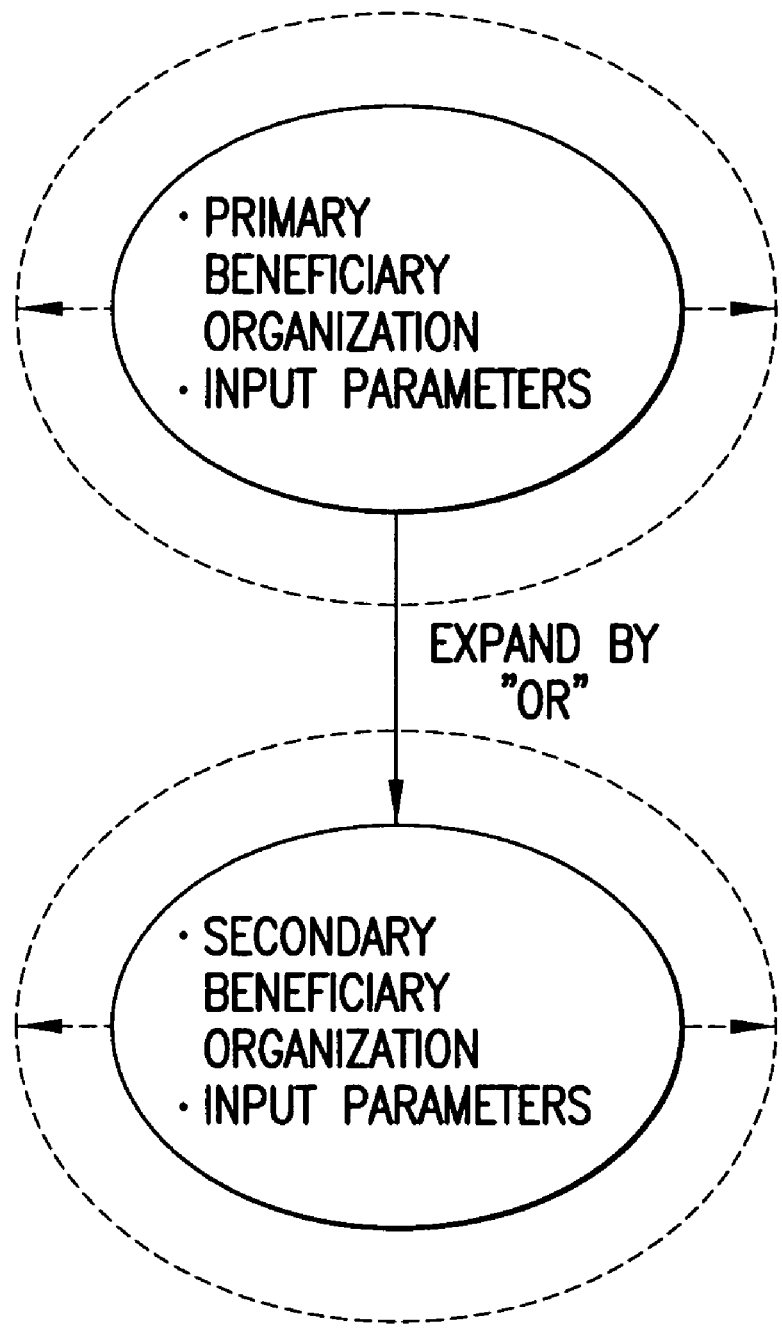
FIG. 5 is another illustration of expanding concentric circles.

As shown in FIG. 5, the synergistic concentric circles need not only be expanded outwardly in the system of the present application, but can also be expanded to another plane. For example, a primary beneficiary group can be associated with a user 300, as well as a secondary beneficiary group. This can be done either through prioritized input or through a pre-registration process. As such, a search for a provider 330 can be conducted based upon the input search request or parameters that are input, wherein a search is initially conducted in association with the primary beneficiary group; and then a synergistic concentric circle is expanded to a new plane (essentially forming a new plane of an overall synergistic concentric sphere), to conduct the search in association with the second beneficiary group and the same input parameters. Thereafter, one or both of the primary and secondary beneficiary groups or any of the various input parameters of the search request, can be expanded to thereby expand either one or both of the synergistic concentric circles outwardly to thereby form secondary synergistic concentric circles as shown in FIG. 5. In both instances as shown in FIGS. 4 and 5, the synergistic concentric circle arrangement and expansion thereof is done in association with a search request and at least one beneficiary group associated with the user 300.

Figure 6:
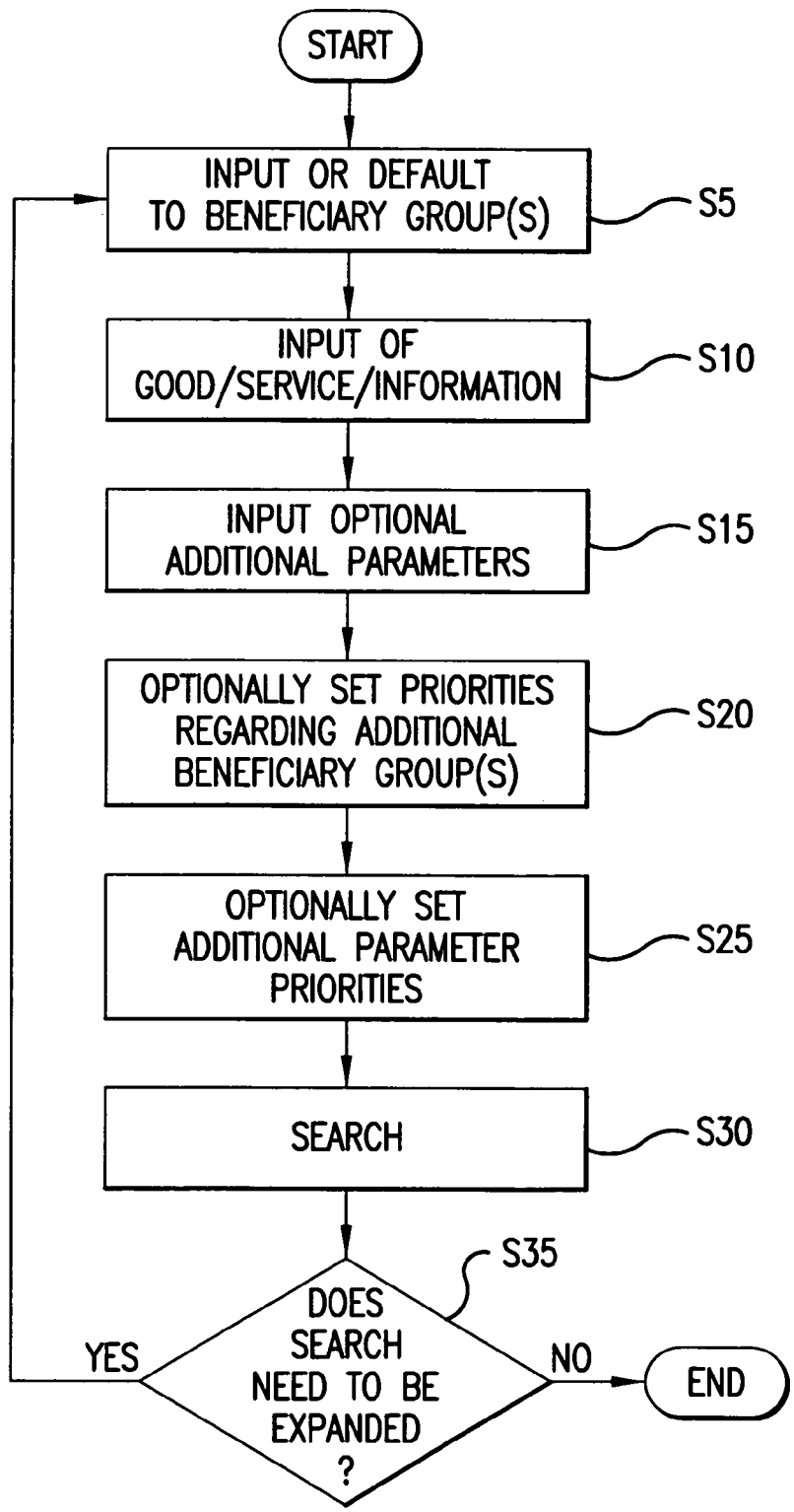
FIG. 6 is a general flow diagram for performing the methodology of the present invention.

FIG. 6 illustrates one example of the general methodology utilized in conducting a search for a provider 330 in connection with the present application. Initially, as previously stated, a beneficiary group 335 is associated with a search request of the user 300, either by input through a computer device or by default (based upon that prestored during the registration process, for example) as indicated in Step S5 of FIG. 6. This can, but need not, include additional beneficiary groups for a search involving providers 330 of any one of the associated beneficiary group (a Boolean "OR" arrangement so as to include providers of either a first or second beneficiary group, for example).

In Step S10, the user 300 adds to the search request, via input into the computer device, a search object, namely a type of good, service or information that is desired by the user 300, in an attempt to locate a provider 330 of such a desired good, service or information, who is associated with the user-specified beneficiary group. Such a search object can generally describe a good, service or information desired (such as a camera, for example, to provide a large expensive search), or can specifically describe the desired good, service or information (such as a Canon digital camera, for example) to provide a narrower search. Further, the search request can (but need not) also include additional parameters further restricting the search, such as geographic parameters specifying a location of the provider for example. These can be input in Step S15. These can include specific locations, such as Fairfax Va. or general locations such as Virginia, for example. The geographic parameters can be used to limit searches to providers 330 within a local community.

Thereafter, in Step S20, the user 300 may be provided with the option to set priorities with regard to expansion of the search request to a new synergistic concentric circle involving an additional beneficiary group, or synergistic concentric circle expansion of the same beneficiary group in Step S20. For example, the user may be provided with the option to set priorities so that a first search can be conducted utilizing the specific beneficiary group of the Korean Methodist Church, and an expanded second search can thereafter be conducted utilizing the Korean Church generally, if a null or otherwise unsatisfactory search result is obtained. Further, the user 300 may also be provided with the option to set priorities regarding additional beneficiary groups such that a first search can be conducted utilizing the Korean Methodist Church, and a second search can be conducted thereafter utilizing the Boy Scouts of America. Each of these aspects will be described further with regard to FIGS. 8 and 9 for example.

Finally, in Step S25, the user 300 may be provided with the ability to optionally set additional parameter priorities. For example, a user 300 can designate a first search to be conducted based upon providers 330 located in Fairfax, Va., with a second expanded search being conducted based upon providers 330 being located anywhere in Virginia, utilizing geographical expansion of the synergistic concentric circles in a preset or prioritized manner as shown in Step S25.

Accordingly, all of the input search request information, including various input elements or parameters of the search request and the user-specified beneficiary group(s), is received at the information server 120. Thereafter, the server 120 conducts a search for all providers 330 of the requested good, service or information, who are associated with the user-specified beneficiary group(s) (associated with the user) and who match any additional parameters (such as geographic parameters, for example), in Step S30. Results of any located providers 330 matching the search criteria and associated beneficiary group, are then output to and preferably displayed to the user 300. This will be discussed further in association with FIG. 7.

In Step S35, it is determined whether or not the search needs to be expanded. In other words, has the user 300 received a null or otherwise unsatisfactory search result. At this time, the user 300 can review the names, locations, and other information regarding the providers 330 located in the search (if any such providers 330 have been located based on all of the above-noted parameters), and if none of these providers 330 are acceptable or if no providers 330 have been located, the user 300 has the option to expand the search. This is one way which serves to prompt expansion of at least one synergistic concentric circle. The expansion can be done based on previously prioritized expansion, if initially designated. Alternatively, it can be done manually by expanding the beneficiary group(s), by expanding the designation of the search object, by expanding the geographical local of the provider 330, etc. Thus, dynamic expansion capabilities to dynamically expand at least one of the synergistic concentric circles is provided.

As previously stated, this "secondary" or expanded search can be done automatically in a prioritized manner by setting search expansion priorities prior to conducting the search or can be conducted after the user 300 has viewed the results of an initial search. If the search does need to be expanded, then the process moves from Step 35 back to Step 5 to repeat any or all of Steps S5 to S25, and thereafter repeat the search of Step S30 (or moves to Step S30 to execute an expanded search based upon preset expansion priorities). If the search does not need to be expanded and the user 300 is satisfied with the results of the search, the search is ended. At this time, if the user 300 so desires, the user 300 can select and transact business with a selected provider 330. For example, the user 300 can click on a hyperlink, and link to a website of a selected provider 330 (or can find the address and walk, drive, etc. directly to the provider 330 itself) to conduct a business transaction for the desired good, service or information. This will be discussed in more detail regarding FIG. 10.

Accordingly, as such, users 300 of the system and providers 330 of a good, service or information are commonly associated with at least one beneficiary group. By using beneficiary groups, an arrangement is provided to the user 300, for searching for a provider 330 based upon a search request input to a computer device, wherein the provider 330 is associated with the beneficiary group specified by and associated with the user 300. More preferably, an input search request including a user-specified associated beneficiary group are received from a computer device of a user 300, and a provider 330 is searched for based upon a synergistic concentric circle search arrangement, using the received input search request including the user-specified beneficiary group. A synergistic concentric circle arrangement may be expanded (by further input information, for example) and further such expansion may be prioritized based upon originally input information received from the user 300 for expanding various search parameters and/or designations of a beneficiary group or groups. The information server 120 of the present invention utilizes the database (such as database 290), adapted to store information associating the user 300 with at least one beneficiary group and a provider 330 with at least one beneficiary group; as well as a controller such as CPU 260, adapted to receive information from the user 300, to conduct the search and eventually provide a search result to the user 300 including a provider 330 associated with the user-specified beneficiary group.

FIG. 7 illustrates one example of a display screen 700 for display of search request parameters and search results on a computer device of a user 300. The display screen, for exemplary purposes only, is shown as including a search request part 705 and a search parameter result part 755. It should be noted that this display is not to be considered limitative of the present invention as any arrangement for displaying input and result information can be utilized including, but not limited to, separate portions for input and results, and/or sequential screens for inputting information and for displaying results of a search.

In the general search request part 705, the user 300 can optionally be provided with first input area 710 for inputting the search request, namely the desired good, service, or information forming the basis or main part of an input search request. Thereafter, a second input section 720 can optionally be provided, for input of a beneficiary group. If the user 300 has been pre-registered with the system, or if the user 300 has used the system before, a default beneficiary group can optionally appear in area 720. Of course, if pre-registration has occurred, the display of the beneficiary group is optional, as it need not occur at all. Further, as areas 710 and 720 are only exemplary it should be understood that a single search request input area can be provided for input of the requested search object, optional search parameters, as well as the input or previously associated user-specified beneficiary group.

Other input areas can optionally be provided such as an additional parameter input area 715 for adding other search parameters to the search request such as geographic parameters for example; an additional beneficiary group input area for designating secondary, tertiary, etc., beneficiary groups in an area 720; and/or an area 725 for setting additional search priorities to act as expansion parameters for expanding one or more synergistic concentric circles of the synergistic concentric circle arrangement. The search can begin, and the search request can be received by the information server 120, by thereafter activating a start or enter button on the computer device of the user (through a touch panel, keyboard etc.), for example.

With regard to any input search parameter or beneficiary group of the search request, it should be understood that any Boolean operator can also be input to expand or restrict the search. For example, as the beneficiary group, the user 300 can input and thus specify both the Korean Methodist Church and the Boy Scouts of America by inputting both beneficiary groups linked by an "OR" operator. Similarly, the search can be restricted only to providers associated with both beneficiary groups by using the "AND" operator. Geographic parameters can be so designated, as can search objects including goods, services and information. As synonyms may exist for a good, such as a cup or a mug, the user can utilize the Boolean "OR" to input "cup or mug" as the search object of the search request, for example.

Of course, it should be understood that prioritized searches as an expansion of at least one synergistic concentric circle of a synergistic concentric circle arrangement can be set at any number of ways, including but not limited to, separate prioritized searches; all expansion parameters being separately designated and prioritized; expanded searches being separately input and prioritized along with associated beneficiary groups; etc.

The other half of the display screen 700 of FIG. 7 illustrates an exemplary search result display area 755. This display area 755 again should not be limited to that shown in FIG. 7. Optionally, it can include, for example, a list of providers 330 matching the input search request and beneficiary group(s) 335 associated with the user 300; beneficiary group(s) associated with the providers 330; locations of the providers 330; a price of the requested good, service or information; a web address (or even hyperlink) of the provider 330; etc. A certain number of providers 330 can be displayed at one time, such as 5 for example, the providers 330 can be listed in any type of scrolled manner; they can be re-categorized in any manner; etc.

Thereafter, if a null search results or if the user 300 is not pleased with the results of the search, prioritized expansion of at least one of the synergistic concentric circles can be conducted, or manual expansion of at least one of the synergistic concentric circles can be conducted by further expanding or more generally describing the type of good, service or information requested; expanding the designated beneficiary group(s); choosing a secondary beneficiary group; expanding the geography of the search; etc. For prioritized searching, the new search terms can automatically appear in windows 705; can automatically be activated if no providers 330 are located in response to the initial search, or can be activated by activating a new enter or search key. For manual search expansion, new terms are entered and the enter or search key is again hit to execute the expanded search. Hereafter, various examples of the preferred search arrangement, utilizing a synergistic concentric circle search arrangement of the present application, will be described.

Figure 8A:
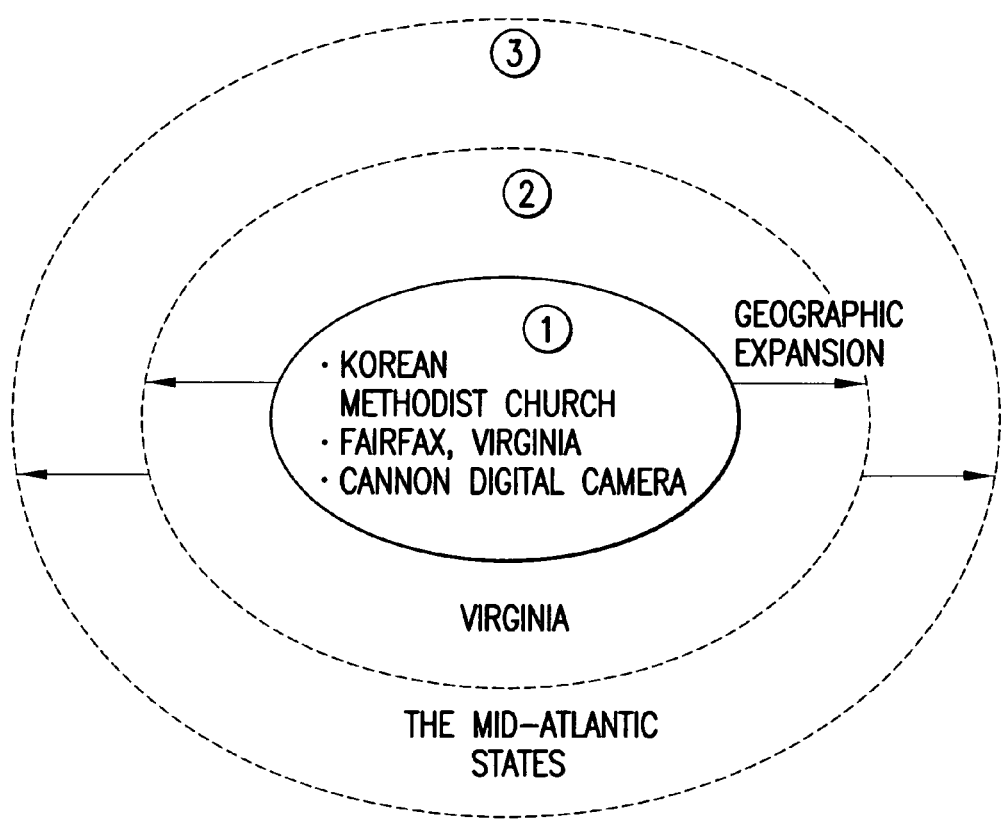
FIGS. 8a to 8d illustrate examples of expansion of concentric circles.

FIG. 8a illustrates an example of a three-level expansion of a synergistic concentric circle arrangement which occur in either of manual or prioritized manners as previously discussed. Initially, at the first level, specific search parameters are input by the user 300. For example, a user 300 may wish to search for a specific type of camera, such as a Canon digital camera, for example. The user 300, who wants to utilize the internet, may wish to buy from some local merchant and therefore, may choose to designate his city and state as additional geographic parameters, namely Fairfax, Va. in the present example. Finally, and most importantly, the user 300 specifies and thereby associates himself with a particular beneficiary group (either automatically through pre-registering or through input) so that he can obtain his requested digital camera from a member of the user-specified beneficiary group, such as the Korean Methodist Church, for example. Accordingly, through the use of some type of computer device such as that shown in FIG. 1, for example, a user 300 is associated with at least one of a plurality of beneficiary groups 335; and a synergistic concentric circle arrangement such as that shown in FIG. 8a is provided for searching on the computer device, based upon the input search request optionally including geographic parameters (which are included in the present example, but which are not necessary for the present invention), and at least one associated beneficiary group.

Thereafter, if no matching providers 330 are located based upon the input search request including the user-specified beneficiary group, or if the user 300 receives unsatisfactory results, the search can be expanded. The second synergistic concentric circle illustrated in FIG. 8a illustrates one such type of expansion of the search, which can be done in a manual or prioritized manner. As such, instead of specifically indicating the search parameter of Fairfax, Va., the synergistic concentric circle is geographically expanded to include any area of Virginia. Thus, the search is then expanded to the second synergistic concentric circle and a search of all providers 330 of Canon digital cameras, associated with the Korean Methodist Church, and located anywhere in the state of Virginia is conducted. If this search yields insufficient or no results, then the search can be further geographically (or otherwise) expanded to expand to a third synergistic concentric circle as shown in FIG. 8a. In this example, the geographic expansion goes to any of the mid-Atlantic states including, Va., Maryland, Delaware, etc., but the same user-specified beneficiary group of the Korean Methodist Church and the same specific product, namely the Canon digital camera, are maintained.

Figure 8B:
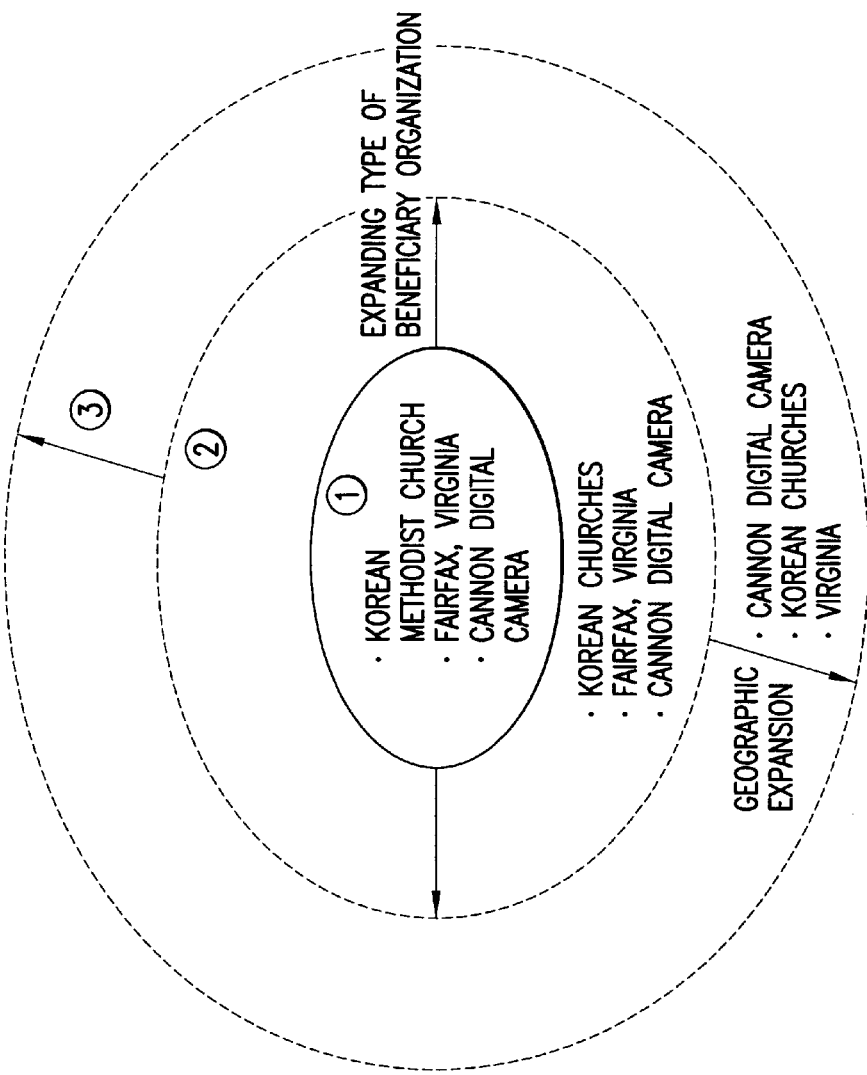

FIG. 8b illustrates two types of expansion of synergistic concentric circles. In this example, the same initial synergistic concentric circle is searched, including the same associated beneficiary group of the Korean Methodist Church, the same geographic area of Fairfax, Va., and the same specific product of the Canon digital camera. With the search yielding unsuccessful or unsatisfactory results, a second synergistic concentric circle is formed, which in this example, expands the type of beneficiary group. Specifically, the same geographic area of Fairfax, Va. is utilized in the search, as well as the same specific product of the Canon digital camera. However, the beneficiary group is broadened or expanded to include all Korean churches, and not just the Korean Methodist Church as was utilized in the first synergistic concentric circle arrangement. Accordingly, users 300 and providers 330 can be associated with one or more beneficiary groups and can further be generally and/or specifically associated with various beneficiary groups. For example, if a provider 330 were associated with a Korean Baptist Church, even if they sold Canon digital cameras in Fairfax, Va., they would not be encompassed and therefore discovered in association with the first synergistic concentric circle of the search shown in FIG. 8b. However, they would be generally associated with Korean churches and thus would be encompassed and therefore discovered in association with the expanded second concentric circle as shown in FIG. 8b.

Finally, FIG. 8b illustrates how a first level of expansion can deal with one aspect of the search, namely expansion or generalization of the type of beneficiary group; while second level of expansion can deal with another aspect of the search request, namely geographical expansion. For example, if no satisfactory results are achieved using the user-specified beneficiary group of the Korean church, the geographic area of Fairfax, Va., and the specific product of Canon digital camera; then another parameter of the search such as the geographic parameter, for example, can be expanded. Again, any type of expansion can be done in a prioritized or manual manner. As shown in the example of FIG. 8b, the third synergistic concentric circle would therefore include the specific product of camera digital camera; the general beneficiary group designation of the Korean churches; and the somewhat general geographic classification of anywhere in Virginia.

Figure 8C:
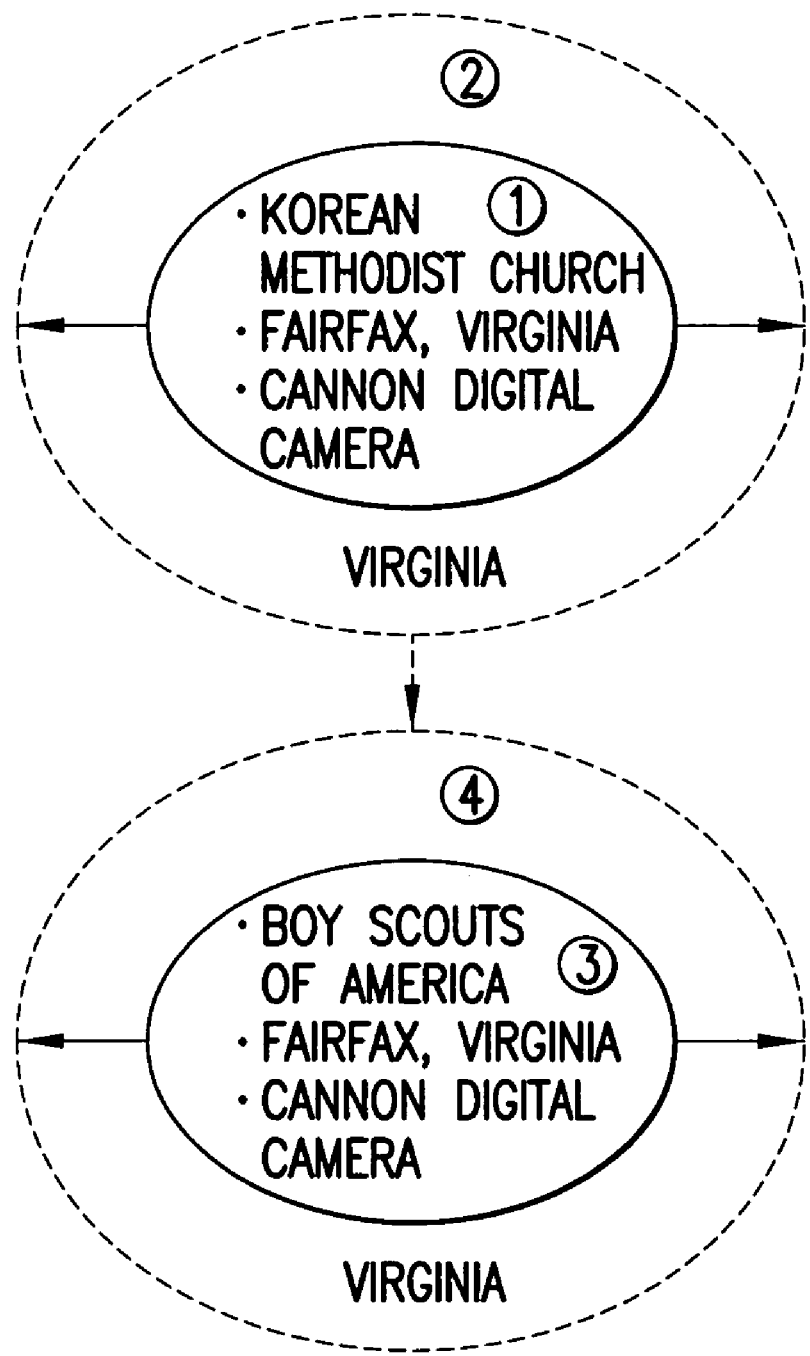

FIG. 8c illustrates how expansion based on a user-specified beneficiary group can not only occur by generically reciting the type of beneficiary group, but can also occur by changing to a secondary beneficiary. In essence, this forms a second level synergistic concentric circle arrangement, or a second synergistic concentric circle in a common synergistic concentric sphere arrangement. The example utilized in FIG. 8c will be discussed as follows.

As shown in FIG. 8c, a user 300 is first associated with a beneficiary group 335 of the Korean Methodist Church. The user 300 inputs his search request including the geographic designation of Fairfax, Va., and a product designation of a Canon digital camera. If the search is unsuccessful or unsatisfactory, the user 300 then expands the synergistic concentric circle arrangement in a manually or prioritized manner, by expanding the geographic parameter to include all areas of Virginia. Next, if no satisfactory providers 330 are discovered, instead of merely expanding an aspect of the input search request or beneficiary group, the user 300 expands the synergistic concentric circle arrangement to encompass a secondary beneficiary group, namely the Boy Scouts of America. Thus, the third search conducted will include the beneficiary group of the Boy Scouts of America, the geographic of Fairfax, Va., and the specific product designation of a Canon digital camera. Thereafter, if search results are unsuccessful or inadequate, geographic expansion to anywhere in Virginia can occur for a fourth level of search. Thus, expansion of a concentric circle arrangement can include expansion to a different beneficiary group so as to allow a user 300 to locate either a provider 330 associated with a primary or secondary beneficiary group of the user, before requiring expansion of the search in any other way.

Figure 8D:
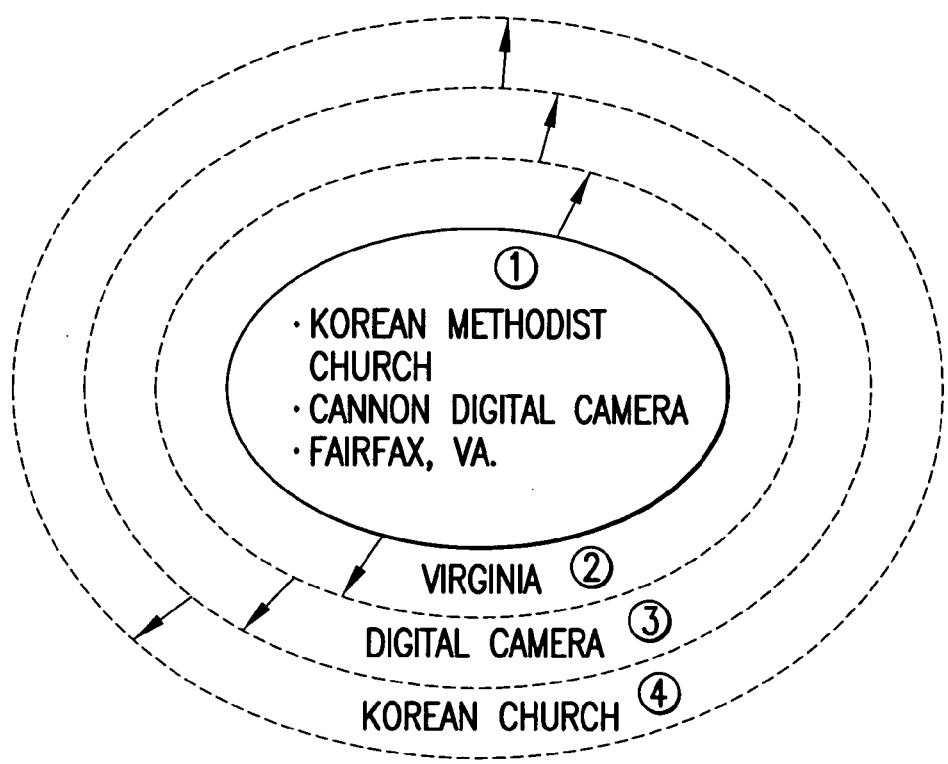

Finally FIG. 8d illustrates several different types of expansion so as to illustrate four synergistic concentric circles or four levels of search in the synergistic concentric circle arrangement provided by the present application. In the first level of search, the general designation of the Korean Methodist Church is utilized for the beneficiary group 335, the product is designated as a Canon digital camera, and the geographic designation of Fairfax, Va. is utilized. If unsuccessful or unsatisfactory results are achieved, expansion of at least one synergistic concentric circle occurs in either a manual or prioritized manner, so as to increase the geographic parameter to any area in Virginia. Thereafter, if the search results are incomplete or inadequate, the product parameter is expanded to include any type of digital camera in the third synergistic concentric circle arrangement. Finally, in the fourth synergistic concentric circle, the beneficiary group parameter is expanded so as to include any type of Korean church, to hopefully obtain adequate search results. This process can continue until the user 300 receives the desired search results or a new search is input.

Figure 9:
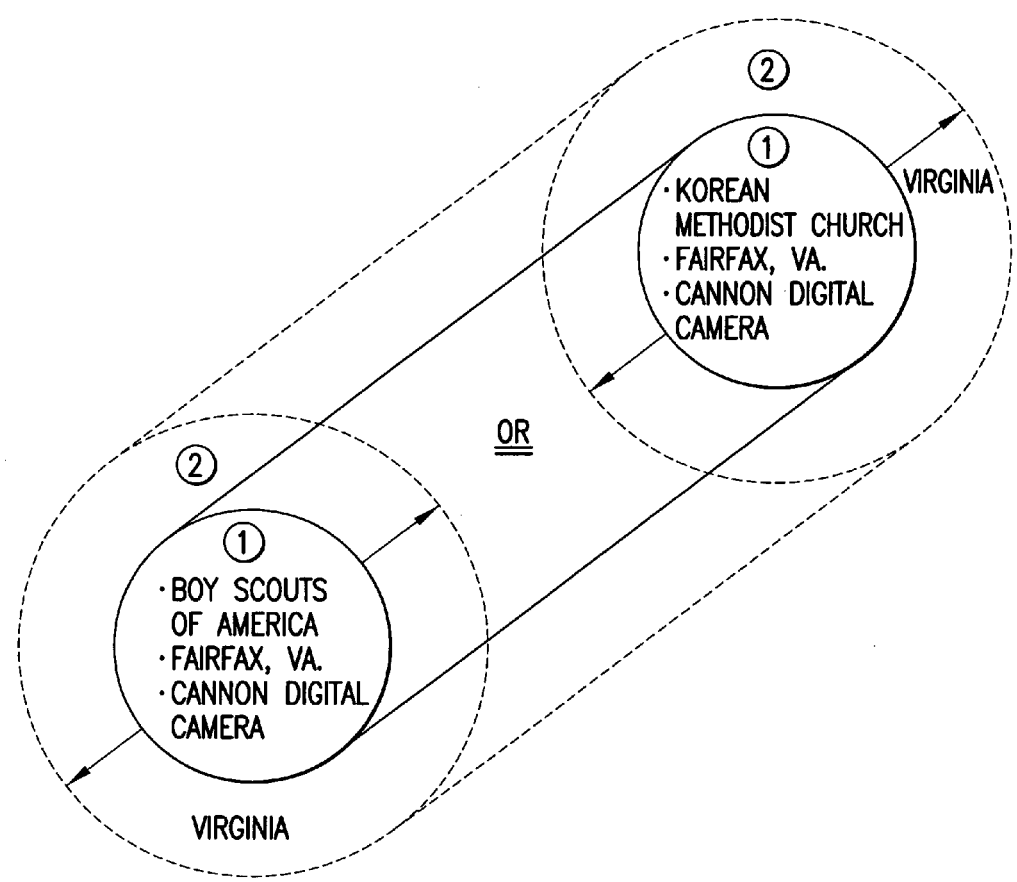
FIG. 9 illustrates another exemplary aspect of expansion of concentric circles.

FIG. 9 provides an illustration of how a single synergistic concentric circle arrangement can include a plurality of beneficiary groups 335 utilizing Boolean parameters. In essence a concentric sphere is formed wherein a combination of beneficiary groups 335 associated with the user 300 are utilized in the search. In the specific example shown in FIG. 9, while the geographic parameter of Fairfax, Va. remains the same, and the product remains the Canon digital camera, the associated beneficiary group 335 includes either the Korean Methodist Church "or" the Boy Scouts of America. As such, the Boolean parameter "or" is utilized in combination with the remainder of the input search request to encompass a search using two user-specified beneficiary groups. Thus, if a provider of a Canon digital camera located in Fairfax, Va. is associated with either the Korean Methodist Church or the Boy Scouts of America, then he will be listed as a provider 330 of the goods desired by the user 300. Thereafter, either one or both of the associated beneficiary groups 335 can be expanded, or other parameters of the search request, such as the geographic parameter as shown in FIG. 9 for example, can be expanded. In the example shown in FIG. 9, the second synergistic concentric circle or expanded synergistic concentric spherical arrangement will encompass either the Korean Methodist Church or the Boy Scouts of America as the designated beneficiary group 335, the Canon digital camera as the product, and anywhere in Virginia has the geographic area.

Figure 10:
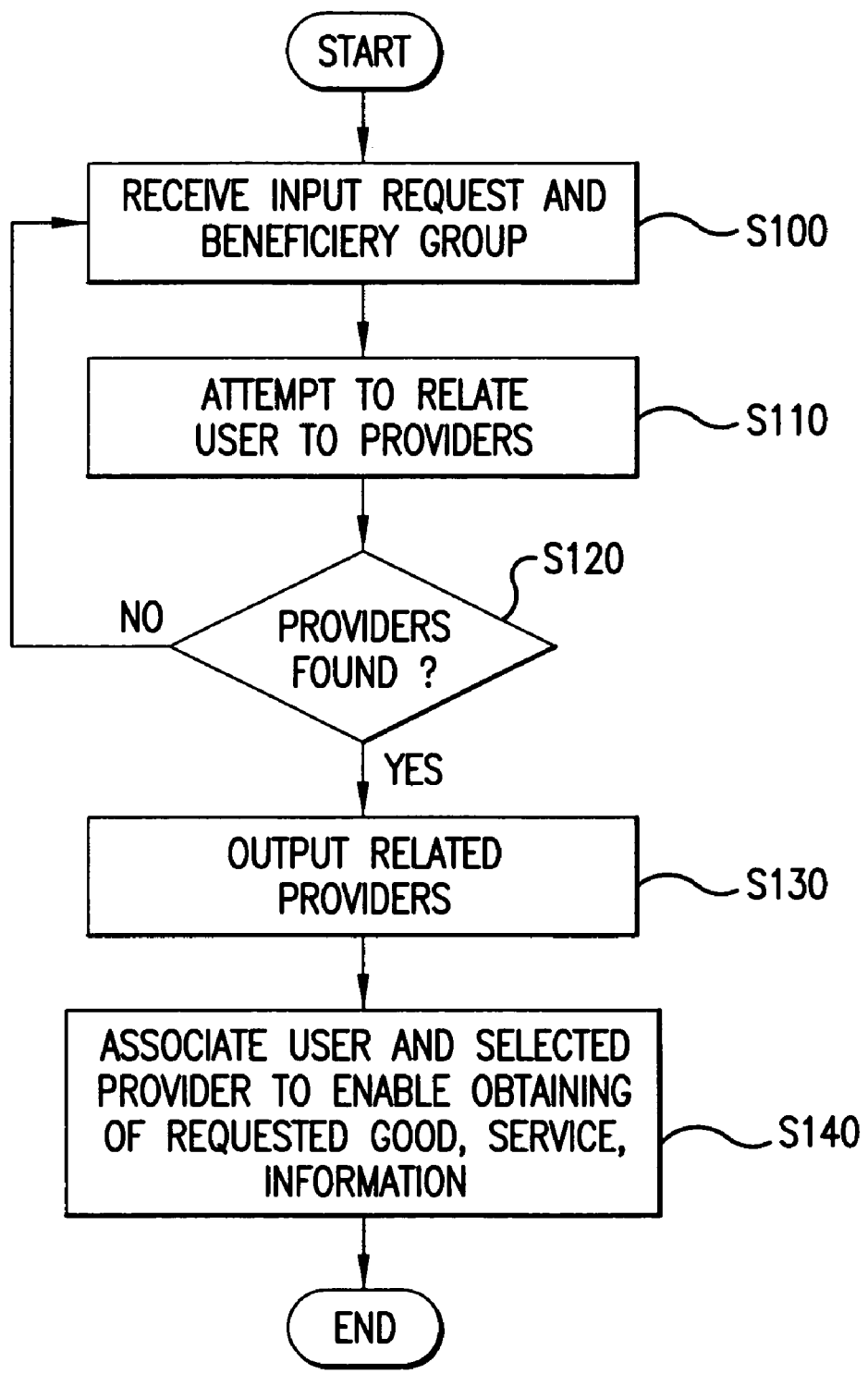
FIG. 10 illustrates another preferred embodiment of the present invention involving transactions of goods, services or information.

FIG. 10 illustrates one example of the general methodology used in providing a system and method enabling a user 300 to obtain a desired good, service or information from a provider 330.

Initially, in Step S100 the information server 120, 220, 320, etc., receives an input search request for a provider 330 of a good, service or information from a user 300, along with a designated beneficiary group 335. The received information can include an input or default beneficiary group(s); the good, service, or information desired; and the additional parameters such as geographical parameters; any priorities regarding the beneficiary group(s); any other additional parameter priorities; etc. as previously discussed with regard to FIG. 6 (for example) and other aspects of the present application. Thereafter, in Step S110 the information server attempts to relate the user 300 to at least one provider 330 of the desired good, service, or information in the manner previously discussed with regard to FIGS. 4-9 for example, the provider(s) being associated with the user-specified beneficiary group 335 associated with the user 300. Further, in Step S120, it is determined whether or not any such related providers 330 have been found. If not, the procedure continues back to Step S100 for automatic (based on any preset priorities for example) or manual expansion of the input search request in a manner similar to that previously set forth in the application. Thus, the search methodology previously described in FIGS. 1-9 is incorporated herein and will not be repeated for the sake of brevity.

If at least one related provider 330 has been found in Step S120, the process proceeds to Step S130 wherein the related providers 330 are output to the user 300. The information can be output, for example, in a search result chart such as that shown as element 755 in FIG. 7. Thereafter, in Step S140, the system arranges for the user 300 to obtain the desired good, service or information from the at least one provider 330. More specifically, in Step S140, the user 300 is associated with a selected provider 330 to enable the user 300 to obtain the requested good, service or information. For example, as shown in FIG. 7, the web address of a provider(s) 330 may be displayed to the user 300 in the form of a hyperlink, for example, wherein the user 300 can merely click on the web address of a provider 330 to thereby select the provider 330 and enable the user 300 to go to the website of the provider 330 and thereafter obtain (through a business transaction, for example) the requested good, service or information from the provider 330 upon payment therefore. If the user 300 is not happy with the provider 330, the user 300 need only go back to the display screen 755 on his computer device, and select another provider 330. If the user 300 is happy with the provider 330, and the good, service or information that the provider 330 is offering, the user 300 can then transact business with the provider 330 in any number of known ways such as through an on-line or off-line credit transaction; utilizing a check, cash, or any other method of payment which can be used to purchase the good, service or information from the provider 330. In the alternative, with the location of the provider 330 displayed as shown in FIG. 7, the user 300 can visit the business or store of the provider 330 (such as a local merchant within his community, for example), and purchase the requested good, service, or information.

As such, a method and system are provided for associating the users 300 and providers 330 with at least one of a plurality of beneficiary groups; providing an arrangement relating a user 300 to at least one provider 330 of a desired good, service or information based upon a request for the desired good, service or information input to a computer device of the user 300, with the at least one provider 300 being associated with a user-specified beneficiary group associated with a user 300. A request, including a desired good, service or information is received, along with at least one beneficiary group; a user 300 is then related to at least one provider 330 associated with the same at least one beneficiary group; and arrangement is then made for the user 300 to obtain the requested good, service, or information (by providing a list of providers 330 to the user 300, for example).

More preferably, the system and method provide an arrangement for matching a user 300 with a provider 330 to permit the conducting of a business transaction between the user 300 and the at least one associated provider 330 so that the user 300 can obtain the desired good, service, or information; and even more preferably provide a link (such as a URL address or hyperlink) or address for connecting the user 300 to the at least one provider 330. The system enables such a method by providing the database, adapted to store information associating users 300 and/or providers 330 with at least one beneficiary group; and a controller adapted to perform the process eventually providing an arrangement to the user 300 for transacting business with a provider 330 of a desired good, service, or information and associated with a user-specified beneficiary group of the user 300, to obtain the desired good, service or information.

Further, the system and method of the present application associate a provider 330 of a good, service or information with at least one beneficiary group; and offer the good, service, or information for sale to a user 300. Thus, if the user 300 desires to obtain the offered good, service or information, he can make a request from the computer device and be offered the good, service, or information from a provider 330 associated with the same user-specified beneficiary group.

By providing an output display to the user 300, such as that shown in FIG. 7 for example, the user 300 can either link to a provider over the network and thereafter obtain the desired good, service or information in an "on-line" transaction (or in a subsequent "off-line" transaction via phone, for example); or, if the display provides location as shown in FIG. 7 for example, the user 300 can merely visit the local provider 330 and obtain the desired good, service, or information at the location of the provider 330 itself. As such, by utilizing a beneficiary group 335 to maintain links to the community, the user 300 can actually obtain an identification of providers 330 of a desired good, service or information which are located within his community and can thereafter transact business with local merchants. As such, a user 300 can target local merchants in a quick and efficient manner without the need to visit a plurality of these local "mom and pop" stores to determine whether or not the merchant has a desired good, service or information. Further, by providing the search results such as those shown in FIG. 7, a user 300 can immediately determine whether or not the price of a desired good, service or information of a local merchant is higher, or is relatively competitive with that of a large retail chain.

With regard to the system and method of the present application, the entity establishing the information server and providing this service to many users 300 and providers 330 can charge a fee to the users 300 for using this service; can charge a fee to the providers 330 for using this service; and/or can charge a fee based on the number of transactions completed utilizing this service; etc. The beneficiary groups 335 signing up to participate in the service can also receive some portion of the proceeds (various overall money and/or fees charged to the providers 330 and/or users 300). Regarding these proceeds splitting arrangements, the example of FIG. 11 is provided.

Figure 11:
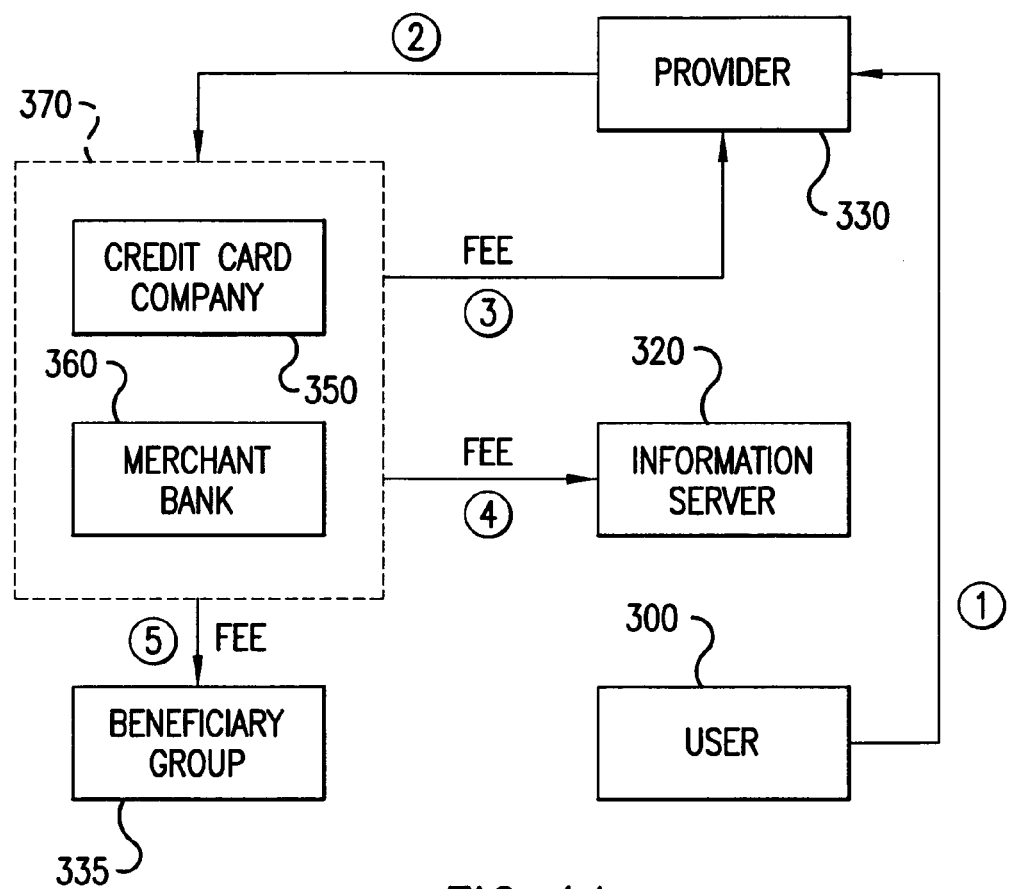
FIG. 11 illustrates a preferred fee splitting arrangement of another embodiment of the application.

In another preferred embodiment of the present application, a unique proceed splitting arrangement has been designed as shown in FIG. 11. In this system, the user 300, after receiving and selecting the provider 330 of a desired good, service, or information, desires to transact business with a provider 330. Accordingly, as shown by number 1 in FIG. 11, the user 300 sends some form of payment, such as a check, credit card number, etc., to the selected provider 330. Thereafter, as designated by number 2 in FIG. 11, the provider 330 contacts the payment entity 370 (which can include a credit card company 350, a merchant bank 360, etc.). In a normal arrangement, the payment entity 370, after verifying that the user 300 has sufficient funds to cover the transaction with the provider 330, would then have to send the entire payment (charged to the account of the user 300), directly to the provider 330. Thereafter, based upon an arrangement wherein the information server 320 and/or beneficiary group 335 receive a portion of the overall proceeds, the provider 330 would then have to send a portion of the funds received for the user 300 to the information server 320 and/or to the beneficiary group 335.

However, in conjunction with this novel system and method of the present application, the payment entity 370 instead sends a portion of the proceeds to the provider 330 as shown by number 3 in FIG. 11; sends another portion of the proceeds as shown by number 4 in FIG. 11, to the information server 320; and sends another portion of the proceeds as shown by number 5 in FIG. 11, to the beneficiary group 335. Accordingly, utilizing such a novel proceeds splitting arrangement, the information server 320 can arrange for a per rate transaction percentage with a provider 330, wherein the beneficiary group 335 also can enter into a per transaction arrangement, such that the information server 320 receives a percentage and/or designated fixed fee on a per transaction basis.

As an example, the information server 320 establishes a first arrangement with a provider 330, wherein the information server 320 receives two percent of every sale completed by provider 330. In the same arrangement, the beneficiary group 335 receives an additional one percent of every sale. Thus, when a user 300 purchases a good, service or information from provider 330, instead of the provider 330 having to calculate and account for these percentages and send separate portions of the received proceeds to the information server 320 and/or beneficiary group 335 (or various percentages of sales to various beneficiary groups), no such accounting need take place and the proceed portions owed to the information server 320 and the beneficiary group 335 are allocated automatically from the payment entity 370.

As one of ordinary skill would appreciate, this novel proceeds splitting arrangement can be used in any type of transaction, and is not limited to its use in conjunction with the system and method of FIGS. 1-10 of the present application. For example, in an Internet environment, the use of hyperlinks from one website to another, referring a sale from one website site owner to another, might result in a percentage of sales being owed to the referring website owner. As such, the proceeds splitting arrangement is shown in FIG. 11, wherein the payment entity automatically allocates and sends a percentage of any proceeds to the referring website owner and sends the rest of the proceeds to the selling website owner, can be used. Similarly, the system and method is equally applicable to any other type of on-line or off-line arrangement, wherein a percentage of any transaction proceeds would be split between two entities. The payment entity 370 need merely store information regarding a particular proceeds splitting arrangement and any percentage allocation per transaction payment owed, with such stored information being thereafter accessed each time a transaction takes place.

More preferably, the system and method of the present application first determines a business transaction proceeds allocation between a plurality of entities (based upon predetermined percentages stored in memory, for example); and allocates a determined portion of the business transaction proceeds to at least a first and second entity, upon receiving notification of a business transaction. Accordingly, the payment entity 370 can include an information server 220 such as that shown in FIG. 2, including: some type of controller or CPU 260; a database storage 290 storing an established business transaction proceeds allocation between a plurality of entities; and various additional components as shown in FIG. 2. Thereafter, upon receiving notification from a provider 330 of a business transaction, the payment entity 370 can determine whether or not the business transaction involves a business transaction proceeds allocation between a plurality of entities based upon prestored information; and can thereafter allocate a determined portion of the business transaction proceeds to a first of a plurality of entities and to a second and/or additional entity. This can include, but need not include, a third party such as the party running information server 320 and/or one or more beneficiary groups 335.

As previously stated, the business transaction proceeds allocation is preferably stored in some type of memory such as database storage 290 in a separate information server of the payment entity 370 (separate from the information server 320, for example). The business transaction proceeds allocation can include a fixed fee per transaction for one or more of the entities; and/or can include a predetermined percentage allocation for one or more of the entities. Once allocated, the allocated determined portions of the business transaction proceeds can then be sent to the various entities.

Even more preferably, the payment entity 370 receives a fund distribution request, for distributing funds of a user 300, based upon the business transaction between the user 300 and provider 330. Thereafter, it determines whether or not the fund distribution request is subject to a predetermined business transaction proceeds allocation. In other words, it determines whether or not the request for distribution of funds of the user is one which occurred using an on-line search relationship such as that shown in FIGS. 1-10 of the present application, or any other arrangement which would make it subject to a predetermined business transaction proceeds allocation. Thereafter, the business transaction proceeds allocation is determined only upon first determining that the fund distribution request is subject to such a predetermined business transaction proceeds allocation. As previously stated, the necessary information for determining whether or not a fund distribution request is subject to a predetermined business transaction proceeds allocation and for determining the business transaction proceeds allocation between the plurality of entities are preferably stored in a database storage 290 such as that shown in FIG. 2 of the present application; and the various determinations are preferably made utilizing the controller similar to CPU 260 as shown in FIG. 2 of the present application. Thus, in a most preferred embodiment, the overall system of the present application includes a pair of information servers 220 such as that shown in FIG. 2, one for controlling the associating of users 300 and providers 330 and the other located in conjunction with the payment entity 370, for determining appropriate business transaction proceeds allocations; wherein each of the servers include controllers such as CPU 260 shown in FIG. 2 of the present application and a database storage, such as database storage 290 as shown in FIG. 2 of the present application.

The invention being thus described, it will be obvious that the same may varied in many ways. For example, although all examples given indicated a particular product or good being requested, the invention equally applies to any type of service being offered by a provider, and/or any type of information offered by a provider. For example, if a user desires someone who offers housecleaning services, this information is merely input as the search request, along with at least one associated beneficiary group and perhaps some type of geographic parameter, and providers of this service meeting the input criteria and associated with a corresponding beneficiary group will be output to the user. Similarly, a user could merely desire information such as that concerning mutual funds, for example, and such information can be requested along with the associated beneficiary group such that providers of mutual fund information and associated with the user-specified beneficiary group are reported to the user. Such variations are not to be regarded as a departure from the spirit and scope of the invention, and all such modifications as would be obvious to one of ordinary skill in the art are intended to be included within the scope of the following claims.

What is claimed is:

1. A computer implemented method for allocating proceeds of a business transaction over a network, using at least one information server entity and at least one payment entity to conduct the business transaction, the method comprising the steps of:
    (a) inputting user-specified parameters into the computer; wherein the user-specified parameters include a search object of at least one good, service, and information, and at least one user-specified beneficiary group to receive an allocation of proceeds from the business transaction;
    (b) searching, on the fly, for providers of the search object who are associated with the at least one user-specified beneficiary group;
    (c) determining, on the fly, if at least one responding provider matches the user-specified parameters;
    (d) automatically prioritizing the user-specified parameters, on the fly, if no providers match the parameters or if the matches are unacceptable to the user;
    (e) repeating steps (c)-(d) until at least one match occurs;
    (f) generating a list of providers matching the user-specified parameters;
    (g) selecting a provider from the list of providers acceptable to user to conduct the business transaction;
    (h) determining an arrangement based upon the user-specified parameters, on the fly, between the user and the provider; wherein the arrangement includes the user receiving the search object from the provider and a business transaction proceeds allocation, wherein the provider receives a portion of the business transaction proceeds, the at least one user-specified beneficiary group receives a benefit in the form of the portion of the business transaction proceeds, and the information server entity receive a fee; and wherein the information server entity's fee is the portion of the proceeds in the form of a percentage of the transaction proceeds or a fixed consideration per transaction;
    (i) repeating steps (g)-(h) until the user-specified parameters have been met;
    (j) executing the business transaction, upon the user's acceptance of the arrangement, by causing the delivery of the search object to the user and causing the at least one payment entity to distribute the business transaction allocation proceeds to the at least one user-specified beneficiary, the information server entity, and the provider, pursuant to the arrangement.

2. The method of claim 1, wherein determining the arrangement includes expanding the user-specified parameters to generate a second list of responding providers if an acceptable arrangement cannot be determined with any providers from the list of responding providers.

3. The method of claim 2, wherein the user-specified parameters include a location of the provider.

4. The method of claim 3, wherein automatically prioritizing the user-specified parameters includes expanding the location of the provider.

5. The method of claim 3, wherein automatically prioritizing the user-specified parameters include expanding the location of the at least one of the user-specified beneficiary groups.

6. The method of claim 3, wherein automatically prioritizing the user-specified parameters includes adjusting the user-specified at least one beneficiary group.

7. The method of claim 2, wherein the user-specified parameters include a price offered, on the fly, for the search object.

8. The method of claim 7, wherein automatically prioritizing the user-specified parameters includes adjusting the price offered for the search object.

9. The method of claim 1, wherein the network is selected from a group consisting of the Internet, a communicating system, a wired connection, and a wireless connection.

10. The method of claim 1, wherein the business transaction is an off-line transaction.

11. The method of claim 1, wherein the business transaction proceeds allocation is executed on the network.

12. The method of claim 1, wherein the user prioritizes the user-specified parameters.

* * * * *